(12) United States Patent
Zheng et al.

(10) Patent No.: US 10,914,576 B2
(45) Date of Patent: Feb. 9, 2021

(54) HANDHELD LARGE-SCALE THREE-DIMENSIONAL MEASUREMENT SCANNER SYSTEM SIMULTANEOUSLY HAVING PHOTOGRAMMETRIC AND THREE-DIMENSIONAL SCANNING FUNCTIONS

(71) Applicant: HANGZHOU SCANTECH COMPANY LIMITED, Hangzhou (CN)

(72) Inventors: Jun Zheng, Hangzhou (CN); Shangjian Chen, Hangzhou (CN)

(73) Assignee: ScanTech (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 16/628,967

(22) PCT Filed: Jun. 5, 2018

(86) PCT No.: PCT/CN2018/089863
§ 371 (c)(1),
(2) Date: Jan. 6, 2020

(87) PCT Pub. No.: WO2019/007180
PCT Pub. Date: Jan. 10, 2019

(65) Prior Publication Data
US 2020/0225030 A1      Jul. 16, 2020

(30) Foreign Application Priority Data

Jul. 6, 2017 (CN) .......................... 2017 1 0546383

(51) Int. Cl.
*G01B 11/25* (2006.01)
(52) U.S. Cl.
CPC ................. *G01B 11/2518* (2013.01)

(58) Field of Classification Search
CPC .. G01B 11/2518; G01B 11/2545; G01B 11/25
(Continued)

(56) References Cited

U.S. PATENT DOCUMENTS

| 4,957,369 A | * | 9/1990 | Antonsson | ......... G01B 11/2545 |
| | | | | 356/3.08 |
| 8,082,120 B2 | * | 12/2011 | St-Pierre | ................ G01C 11/02 |
| | | | | 702/85 |

(Continued)

FOREIGN PATENT DOCUMENTS

| CA | 2686904 A1 | * | 6/2011 | .......... G01C 11/025 |
| CN | 107202554 A | | 9/2017 | |

(Continued)

OTHER PUBLICATIONS

International Search Report issued in International Application No. PCT/CN2018/089863 dated Aug. 16, 2018 (2 pages).

(Continued)

*Primary Examiner* — Roy M Punnoose
(74) *Attorney, Agent, or Firm* — Osha Bergman Watanabe & Burton LLP (57) ABSTRACT

A handheld large-scale three-dimensional measurement scanner system simultaneously having photogrammetric and three-dimensional scanning functions includes: two cameras at fixed positions; at least one pattern projector; a photogrammetric module; and a three-dimensional scanning module, wherein at least one of the two cameras is a multipurpose camera that performs photogrammetry and three-dimensional scanning, wherein the photogrammetric module is configured to perform, by operating the multipurpose camera, global photogrammetry on a measured object and obtain three-dimensional coordinates of markers on a surface of the object, and wherein the three-dimensional scanning module is configured to perform, by operating the two cameras and the one pattern projector, three-dimen- (Continued)

sional scanning on the measured object by using the obtained markers as global positioning information of the measured object, and obtain three-dimensional contour data of the surface of the object. The present invention has photogrammetric and three-dimensional scanning functions simultaneously, a high degree of hardware integration, simplicity in operation, and excellent cost-performance ratio.

8 Claims, 4 Drawing Sheets

(58) Field of Classification Search
USPC .......................................................... 356/610
See application file for complete search history.

(56) References Cited

U.S. PATENT DOCUMENTS

| | | | | |
|---|---|---|---|---|
| 8,582,824 | B2* | 11/2013 | Remillard | G06T 7/593 382/108 |
| 8,970,823 | B2* | 3/2015 | Heidemann | G01B 11/2513 356/2 |
| 9,115,986 | B2* | 8/2015 | Heidemann | G01B 11/25 |
| 9,200,899 | B2* | 12/2015 | Rueb | H04N 13/254 |
| 9,217,637 | B2* | 12/2015 | Heidemann | G06T 7/33 |
| 9,599,455 | B2* | 3/2017 | Heidemann | G06T 7/521 |
| 9,628,779 | B2* | 4/2017 | Siercks | H04N 13/254 |
| 9,671,221 | B2* | 6/2017 | Ruhland | G01B 11/2545 |
| 9,858,682 | B2* | 1/2018 | Heidemann | G06T 7/593 |
| 10,070,116 | B2* | 9/2018 | Hillebrand | G06T 19/00 |
| 10,302,424 | B2* | 5/2019 | Cossairt | G01B 11/2518 |
| 10,401,143 | B2* | 9/2019 | Hillebrand | H04N 17/002 |
| 10,499,040 | B2* | 12/2019 | Hillebrand | G06T 7/55 |
| D875,573 | S* | 2/2020 | Gerent | D10/63 |
| 2008/0201101 | A1* | 8/2008 | Hebert | G01B 11/2513 702/152 |
| 2010/0134598 | A1* | 6/2010 | St-Pierre | G01B 11/2513 348/47 |
| 2011/0134225 | A1* | 6/2011 | Saint-Pierre | G01B 11/25 348/47 |
| 2011/0288684 | A1* | 11/2011 | Farlow | G05D 1/0038 700/264 |
| 2012/0182403 | A1* | 7/2012 | Lange | H04N 13/363 348/51 |
| 2012/0307260 | A1* | 12/2012 | Keshavmurthy | G01B 11/2518 356/610 |
| 2013/0050410 | A1* | 2/2013 | Steinbichler | G01B 21/042 348/42 |
| 2013/0100282 | A1* | 4/2013 | Siercks | G01B 11/25 348/135 |
| 2013/0250094 | A1* | 9/2013 | Rueb | G01B 11/005 348/94 |
| 2013/0293684 | A1* | 11/2013 | Becker | G01S 7/4808 348/47 |
| 2014/0028805 | A1* | 1/2014 | Tohme | H04N 13/204 348/47 |
| 2014/0063204 | A1* | 3/2014 | Siercks | H04N 13/254 348/50 |
| 2014/0168370 | A1* | 6/2014 | Heidemann | G01B 11/2513 348/46 |
| 2014/0168379 | A1* | 6/2014 | Heidemann | G01B 11/2531 348/47 |
| 2014/0168380 | A1* | 6/2014 | Heidemann | G01B 11/2518 348/47 |
| 2014/0368373 | A1* | 12/2014 | Crain | H01Q 1/007 342/5 |
| 2015/0025788 | A1* | 1/2015 | Crain | G01S 13/90 701/400 |
| 2015/0042759 | A1* | 2/2015 | Heidemann | G01B 11/25 348/46 |
| 2016/0069670 | A1* | 3/2016 | Ruhland | G01B 11/002 356/610 |
| 2016/0073085 | A1* | 3/2016 | Hillebrand | G06T 7/30 348/51 |
| 2016/0073091 | A1* | 3/2016 | Hillebrand | G01C 11/06 348/48 |
| 2016/0073096 | A1* | 3/2016 | Hillebrand | H04N 5/23293 348/47 |
| 2016/0073104 | A1* | 3/2016 | Hillebrand | G01B 11/25 348/47 |
| 2016/0091311 | A1* | 3/2016 | Rueb | G01C 11/08 348/94 |
| 2016/0343125 | A1* | 11/2016 | Keitler | G06K 9/4671 |
| 2017/0094251 | A1* | 3/2017 | Wolke | H04N 13/246 |
| 2017/0108332 | A1* | 4/2017 | Cossairt | G01B 11/2513 |
| 2017/0193673 | A1* | 7/2017 | Heidemann | G01B 11/2545 |
| 2018/0063510 | A1* | 3/2018 | Wolke | H04N 13/106 |
| 2018/0196135 | A1* | 7/2018 | Crain | H01Q 15/14 |
| 2019/0113334 | A1* | 4/2019 | Wolke | G01S 17/89 |
| 2019/0337230 | A1* | 11/2019 | Kauffmann | B29C 64/386 |

FOREIGN PATENT DOCUMENTS

| | | |
|---|---|---|
| EP | 2230482 A1 | 9/2010 |
| KR | 20040010091 A | 1/2004 |

OTHER PUBLICATIONS

Written Opinion issued in International Application No. PCT/CN2018/089863 dated Aug. 16, 2018 (4 pages).
Notice on Grant of Patent Right for Invention issued in Chinese Application No. 201710546383.6 dated Apr. 3, 2018 (1 page).
Office Action issued in corresponding KR Application No. 10-2020-7003444 with English translation dated Jun. 15, 2020 (9 pages).

* cited by examiner

HANDHELD LARGE-SCALE THREE-DIMENSIONAL MEASUREMENT SCANNER SYSTEM SIMULTANEOUSLY HAVING PHOTOGRAMMETRIC AND THREE-DIMENSIONAL SCANNING FUNCTIONS

Embodiments disclosed herein relate generally to a three-dimensional measurement scanning device, and in particular, to a handheld three-dimensional measurement scanner system.

BACKGROUND

In recent years, with the continuous improvement of computer hardware performance and communication speed, three-dimensional (3D) scanning technology continued to be updated through iteration from contact type to fixed-photography type to handheld type. Handheld type 3D scanning technology is developed largely on the basis of fixed type scanning technology. The main feature distinguishing a handheld 3D scanner from a fixed type 3D scanner is that the relative position between the scanner and the scanned object may be dynamic and arbitrarily changed. In other words, the scanner needs to be aware of its spatial position relative to the scanned object in real time and at the same time obtains, actively or passively, 3D contour data of the surface of the measured object by using principles of stereoscopic vision.

At present, handheld 3D scanners on the market are mainly divided into two classes: handheld white light 3D scanners intended for the consumer field and handheld laser 3D scanners intended for the industrial field. The former obtain the relative spatial position between the scanner and the scanned object by recording and matching geometric or textural features of the surface of the object (such as the system described in Chinese Patent Application No. 200880119267.5, Combined Object Capturing System And Display Device And Associated Method); the latter obtain the relative spatial position between the scanner and the scanned object by identifying and matching the topology of markers attached to the surface of the scanned object. In U.S. Pat. No. 7,912,673, Auto-Referenced System And Apparatus For Three-Dimensional Scanning, a method of implementing a dual-camera 3D scanning system, that is, a handheld laser 3D scanner, based on splicing and positioning of markers is provided. This method realizes the conversion of the three-dimensional contour data of the measured object obtained after the position between the scanner and the measured object is changed to the original object coordinate system by matching, splicing, accumulating and updating information of markers obtained through real-time photographing and the previously obtained set of markers, thereby realizing continuous three-dimensional scanning in a handheld mode. In theory, this method can be used to scan objects having an infinite size. However, because errors may be produced when the newly obtained markers are spliced, the errors may be accumulated as the area scanned continues to increase. In general, the cumulative error per meter is about 0.1-0.3 mm for such handheld three-dimensional scanners. As such, when the size of the scanned area is greater than 10 m$^2$ (such as car- or aircraft-sized objects), the cumulative error may reach levels of millimeters. In another Chinese Patent Application No. 201410794661.6, Handheld Laser Three-Dimensional Scanning Method And Device Based On Marker Trajectory Tracking, a method of implementing a single-camera three-dimensional scanning system, that is, a type of handheld laser three-dimensional scanner, based on marker trajectory tracking and positioning is provided. This patent proposes to position the spatial position relationship between the device and the measured object by tracking known markers in the field of view of a single camera and then to identify and obtain the three-dimensional coordinates of unknown markers and add them to the marker library. This method ingeniously realizes handheld three-dimensional scanning of a single camera, which improves the operation efficiency of the system and lowers the performance requirement of the hardware as compared with the method disclosed in Chinese Patent Application No. 200680014069.3, Auto-Referenced System And Apparatus For Three-Dimensional Scanning. However, it has made no improvement in terms of accumulation of measurement errors (errors are also introduced when new markers are added). When these handheld 3D scanners, which position the device and the scanned object based on the accumulation of markers during scanning, scan large objects, the cumulative errors have to be controlled through additional means.

Currently, a comparatively effective method is to use a global photogrammetric system with a handheld 3D scanner to perform 3D scanning of large-scale objects. Before 3D scanning, the global photogrammetric system obtains the 3D coordinates of all the markers on the surface of the object, and then the set of markers is imported into the software of the handheld 3D scanner. During scanning, the markers obtained by the scanner are directly matched with the previously imported set of markers to obtain the spatial position relationship between the scanner and the scanned object at that time, and finally 3D contour data of the object is obtained by identifying the structured light projected onto the surface of the object. In the above process, the library of the surface markers of the scanned object is not expanded by the continuous identification and splicing by the handheld scanner during the scanning process, but is obtained in advance by global photogrammetry, thus eliminating cumulative errors that result from continuous matching and splicing.

SUMMARY

In order to overcome the deficiencies of the existing three-dimensional scanning method in which the global photogrammetry is separated from the three-dimensional scanning and in which the measurement process is complicated, embodiments of the present invention provide a handheld large-scale three-dimensional measurement scanner system having photogrammetric and three-dimensional scanning functions, a high degree of hardware integration, simplicity in operation, and good cost-effectiveness, realizing continuous photogrammetry and three-dimensional scanning of large work pieces, resulting in large-area three-dimensional contour data while precision is ensured.

An aspect of the present disclosure is to provide a handheld large-scale three-dimensional measurement scanner system simultaneously having photogrammetric and three-dimensional scanning functions, the system comprising: two cameras at fixed positions; at least one pattern projector; a photogrammetric module; and a three-dimensional scanning module, wherein at least one of the two cameras is a multipurpose camera that performs photogrammetry and three-dimensional scanning, wherein the photogrammetric module is configured to perform, by operating the multipurpose camera, global photogrammetry on a measured object and obtain three-dimensional coordinates of markers on a surface of the object, and wherein the three-dimensional scanning module is configured to perform, by operating the two cameras and the one pattern projector, three-dimensional scanning on the measured object by using the obtained markers as global positioning information of the measured object, and obtain three-dimensional contour data of the surface of the object.

In one or more embodiments, one of the two cameras is the multipurpose camera and the other is a single-purpose camera that performs only three-dimensional scanning. Alternatively, both cameras may be multipurpose cameras, if necessary.

In one or more embodiments, the photogrammetric module and the three-dimensional scanning module illuminate the markers disposed on or adhered to the surface of the object by providing, from supplemental light sources with two different wavebands, supplemental lighting on the surface of the measured object, wherein the photogrammetric module provides supplemental lighting on the measured object from a supplemental light source with a first waveband, and the three-dimensional scanning module provides supplemental lighting on the measured object from a supplemental light source with a second waveband, wherein the multipurpose camera uses a dual-waveband filter to filter out light outside the first waveband and the second waveband, and the single-purpose camera uses a single-waveband filter to filter out light outside the second waveband, and wherein the pattern projector projects a pattern on the surface of the measured object in the second waveband.

In one or more embodiments, the first waveband is an infrared waveband, and the second waveband is a red waveband. The photogrammetric module adopts the infrared waveband. In other words, the first waveband of the supplemental light source that corresponds to the multipurpose camera and the first waveband of the dual-waveband filter used by the multipurpose camera are the infrared waveband. The three-dimensional scanning module adopts the red waveband. In other words, the second waveband of the supplemental light source that corresponds to the multipurpose camera and the second waveband of the dual-waveband filter used by the multipurpose camera are the red waveband, and the supplemental light source and the filter of the single-purpose camera use the red waveband. Alternatively, other wavebands can also be selected.

In one or more embodiments, the multipurpose camera uses a relatively high default resolution when the photogrammetric module operates, and the multipurpose camera uses a relatively low resolution identical or similar to that used by the single-purpose camera when the three-dimensional scanning module operates.

In one or more embodiments, the multipurpose camera adjusts its resolution by pixel merging or according to region of interest (ROI). Alternatively, other methods can also be used.

The working steps of the photogrammetric module are as follows: 1) placing encoded markers containing encoded information, non-encoded markers containing non-encoded information, and a scale of a known length of which both ends are encoded markers, on the surface of the measured object; 2) operating the multipurpose camera to capture a set of raw images of the measured object from different positions and angles; 3) inputting the raw images to a first two-dimensional (2D) image extractor to obtain image 2D coordinates of the encoded markers and the non-encoded markers in each image; 4) performing three-dimensional reconstruction of the encoded markers and the scale information by a first 3D reconstructor to obtain spatial three-dimensional coordinates of each encoded marker in a unified world coordinate system and an exterior orientation of each image; and 5) using the image 2D coordinates of the non-encoded markers and the exterior orientation of the image obtained by the first 2D image extractor to compute and obtain, by a second 3D reconstructor, three-dimensional coordinates of the non-encoded markers in the world coordinate system.

The working steps of the three-dimensional scanning module are as follows: 1) inputting two-dimensional images simultaneously obtained by the two cameras to a second 2D image extractor to obtain image two-dimensional coordinates of the non-encoded markers in each image and image two-dimensional coordinates of feature points projected by the pattern projector onto the surface of the measured object; 2) inputting the image two-dimensional coordinates of the non-encoded markers in the two simultaneously obtained images and the known position relationship between the two cameras to a third 3D reconstructor to obtain three-dimensional coordinates of the current non-encoded markers in the current device coordinate system; 3) inputting three-dimensional coordinates of the current non-encoded markers in the device coordinate system obtained in a previous step to a marker matcher, wherein the marker matcher matches topological features of the inputted three-dimensional coordinates of the markers in the device coordinate system with the non-encoded marker library obtained by the photogrammetric module to obtain three-dimensional coordinates of the current non-encoded markers in the world coordinate system and to further obtain an RT transformation matrix under the transformation from the current device coordinate system to the world coordinate system; 4) inputting the image 2D coordinates of the feature points projected by the pattern projector onto the surface of the measured object and obtained by the second 2D image extractor to a fourth 3D reconstructor to compute and obtain three-dimensional point cloud coordinate data of the surface of the measured object in the device coordinate system; and 5) transforming, by a coordinate converter, a 3D point cloud outputted in the previous step from the device coordinate system to the world coordinate system using the RT transformation matrix obtained in step 3).

The three-dimensional scanning module may obtain the spatial position between the scanner and the measured object by matching the captured markers of the surface of the object with the marker library during 3D scanning, using the three-dimensional coordinate information of the markers of the surface of the object obtained by the photogrammetric module as the known marker library of the measured object, and then obtain three-dimensional contour data of the surface of the measured object by identifying the pattern projected by the pattern projector onto the surface of the measured object. Alternatively, the three-dimensional scanning module may obtain the spatial position between the scanner and the measured object with the two cameras by continuously identifying, splicing, and adding markers to dynamically build the maker library in real time and simultaneously matching the currently obtained markers with the marker library, and then obtain three-dimensional contour data of the surface of the measured object by identifying the pattern projected by the pattern projector onto the surface of the measured object and performing coordinates conversion.

The technical concepts of the present disclosure are maximization of the use of hardware resources for multiple purposes, realization of continuous photogrammetry and 3D scanning of large-scale workpieces, and realization of large-area 3D contour data while precision is ensured. The most straightforward method is that the system uses three cameras, two of which are used for 3D scanning and the third specially for photogrammetry. However, this results in idleness of camera(s) in both the photogrammetry phase and the 3D scanning phase. The weight of the whole system will also become unsuitable for handheld operations and the overall hardware costs will increase. In order to achieve the combination of photogrammetry and handheld 3D scanning with less hardware, use of two cameras is a feasible solution with good cost-effectiveness. However, what are required of the cameras for photogrammetry and 3D scanning are not identical.

Because the more encoded markers are contained in each captured image and the higher the resolution of each marker is during photogrammetry, the better the overall precision is, a camera with a very high resolution is required for the multipurpose camera. In general, three million pixels or above will be comparatively suitable. However, the multipurpose camera does not need such a high resolution during three-dimensional scanning. One reason is that the distance from the measured object during handheld scanning is shorter than that during photogrammetry. Another reason is that it is still difficult for the current hardware performance of data transmission and processing to achieve high resolution for both. The camera resolution of the dual-camera handheld scanners currently in the market is lower than two million. In order to implement the multipurpose camera for photogrammetry and 3D scanning, the multipurpose camera may use the function of pixel binning during 3D scanning. In other words, the resolution of the high resolution multipurpose camera is adjusted as identical or similar to that of the single-purpose camera, and the default high resolution is used for measurement during photogrammetry.

Photogrammetry usually requires a greater distance from the measured object to capture a larger area with the distance being generally between 1.5 m and 4.5 m, while handheld 3D scanning requires a relatively shorter distance to the measured object to obtain better scanned details with the distance being generally between 0.2 m and 0.5 m. In other words, the focal length of the multipurpose camera during 3D scanning is smaller than the focal length during photogrammetry. For scanner cameras of which the lens must have its parameters such as focal length and aperture adjusted and fixed and of which the internal parameters have been calibrated before leaving the factory, it is difficult to adjust the focal length by mechanical, hardware, or software means according to the purpose of use during scanning and measurement. To this end, a very effective method is the use of two different wavebands, based on the principle that the longer the wavelength is, the greater the focal length is for the same lens on the premise of fixed focal length and aperture. The shifts between light of different wavebands are eliminated to some extent by current manufacturing processes of lenses, but the offset is smaller for infrared wavebands—to realize two focal lengths, thereby realizing the use of the camera for multiple purposes. Since photogrammetry usually requires a greater distance, an infrared waveband of 850 nm is used for shooting in this embodiment. LEDs of 850 nm waveband are used to provide supplemental lighting on the scanned object, and the multipurpose camera obtains images of the scene through a filter that passes 850 nm waveband. However, three-dimensional scanning requires a relatively shorter distance to the measured object; thus, a 660 nm red laser is used as the light source of the pattern projector. 660 nm LEDs provide supplemental lighting on the scanned object, and the two cameras can obtain images of the scene through a filter that passes 660 nm waveband. Since the multipurpose camera is used for both photogrammetry and 3D scanning, the filter equipped therewith needs to be a dual-waveband filter for both 850 nm and 660 nm wavebands and needs LEDs of said two wavebands for providing supplemental lighting.

The beneficial effects of embodiments of the present invention include the combination of guaranteed large-scale precision of global photogrammetry and high-degree representation of detail features of three-dimensional scanning, simplification of the measuring and scanning process, and high degree of hardware integration.

Other aspects of the disclosure will be apparent from the following description and the appended claims.

DETAILED DESCRIPTION

Embodiments of the present disclosure will be described below in reference to the drawings.

Referring to FIGS. 1 to 4, a handheld large-scale three-dimensional measurement scanner system having photogrammetric and three-dimensional scanning functions according to one or more embodiments of the present disclosure comprises two cameras at fixed positions, at least one pattern projector 104, a photogrammetric module, and a three-dimensional scanning module. At least one of the two cameras is a multipurpose camera 101 used for both photogrammetry and three-dimensional scanning. The two functional modules of the system can work independently or in association with each other. The photogrammetric module is configured to perform, by operating the multipurpose camera 101, global photogrammetry on a measured object and obtain three-dimensional coordinates of markers on a surface of the object. The three-dimensional scanning module is configured to perform, by operating the two cameras and the one pattern projector 104, three-dimensional scanning on the measured object by using the obtained markers as global positioning information of the measured object, and obtain three-dimensional contour data of the surface of the object.

Figure 1:
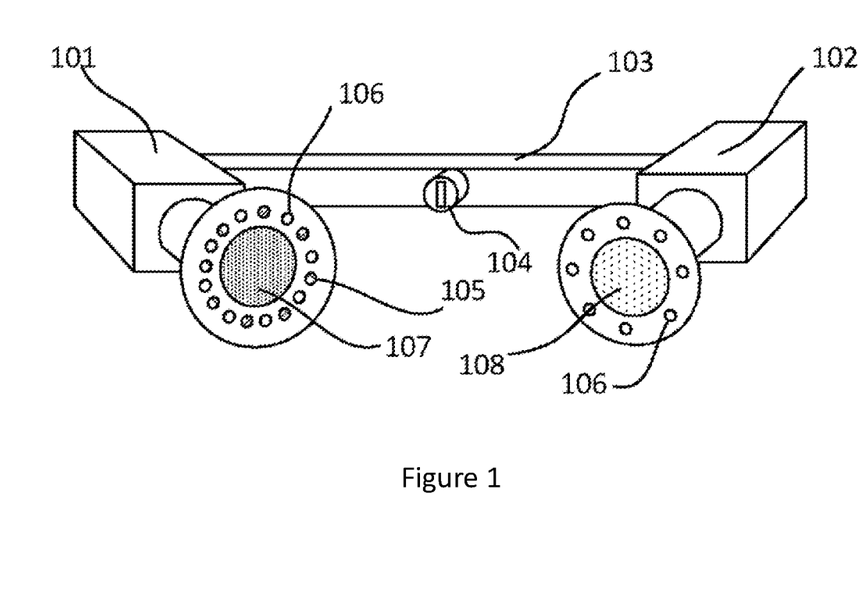
FIG. 1 is a schematic diagram of an implementation of a handheld large-scale three-dimensional measurement scanner system having photogrammetric and three-dimensional scanning functions according to one or more embodiments.

In one or more embodiments, one of the two cameras is the multipurpose camera 101 and the other is a single-purpose camera 102 used only for three-dimensional scanning. Alternatively, both cameras may be multipurpose cameras, if necessary.

In one or more embodiments, the photogrammetric module and the three-dimensional scanning module illuminate the markers disposed on or adhered to the surface of the object by providing, from supplemental light sources with two different wavebands, supplemental lighting on the surface of the measured object. The photogrammetric module provides supplemental lighting on the measured object from a supplemental light source with a first waveband, and the three-dimensional scanning module provides supplemental lighting on the measured object from a supplemental light source with a second waveband. The multipurpose camera uses a dual-waveband filter to filter out light outside the first waveband and the second waveband, and the single-purpose camera uses a single-waveband filter to filter out light outside the second waveband. The pattern projector projects a pattern on the surface of the measured object in the second waveband.

In one or more embodiments, the first waveband is an infrared waveband, and the second waveband is a red waveband. The photogrammetric module adopts the infrared waveband. In other words, the first waveband of the supplemental light source that corresponds to the multipurpose camera and the first waveband of the dual-waveband filter used by the multipurpose camera are the infrared waveband. The three-dimensional scanning module adopts the red waveband. In other words, the second waveband of the supplemental light source that corresponds to the multipurpose camera and the second waveband of the dual-waveband filter used by the multipurpose camera are the red waveband, and the supplemental light source and the filter of the single-purpose camera use the red waveband. Alternatively, other wavebands may also be selected.

In one or more embodiments, the multipurpose camera uses a relatively high default resolution when the photogrammetric module operates, and the multipurpose camera uses a relatively low resolution identical or similar to that used by the single-purpose camera when the three-dimensional scanning module operates.

In one or more embodiments, the multipurpose camera adjusts its resolution by pixel merging or according to region of interest (ROI). Alternatively, other methods can also be used.

A frame member 103 that fixes the two cameras and the pattern projector is used to ensure that the relative position between the two cameras and the pattern projector is fixed. The pattern projector 104 may be a single-line or multi-line line laser that operates with the second waveband. A multi-line laser can generate more contour strips in each frame, thereby improving the scanning efficiency. However, a specific verification mechanism is required for identifying (a method used by a handheld laser three-dimensional scanning system for verifying a plurality of laser lines is described in detail in Chinese Patent Application No. 201610824489.3, Three-Dimensional Sensor System And Three-Dimensional Data Acquisition Method). The supplemental light source 106 is a set of LEDs of which the center waveband is the second waveband, and the supplemental light source 105 is a set of LEDs of which the center waveband is the first waveband. When the photogrammetric module operates, only the LEDs with the first waveband on the multipurpose camera is activated to provide supplemental lighting on the scene. When the three-dimensional scanning module operates, the LEDs with the second waveband on the multipurpose camera and on the single-purpose camera simultaneously provide supplemental lighting on the measured object. Element 107 is a dual-waveband filter that passes the first waveband and the second waveband, and element 108 is a single-waveband filter of which the center waveband is the second waveband. By cooperation of the supplemental lighting LEDs, the filters, and the pattern projector, the system can operate with the first waveband during global photogrammetry and with the second waveband during 3D scanning.

Figure 2:
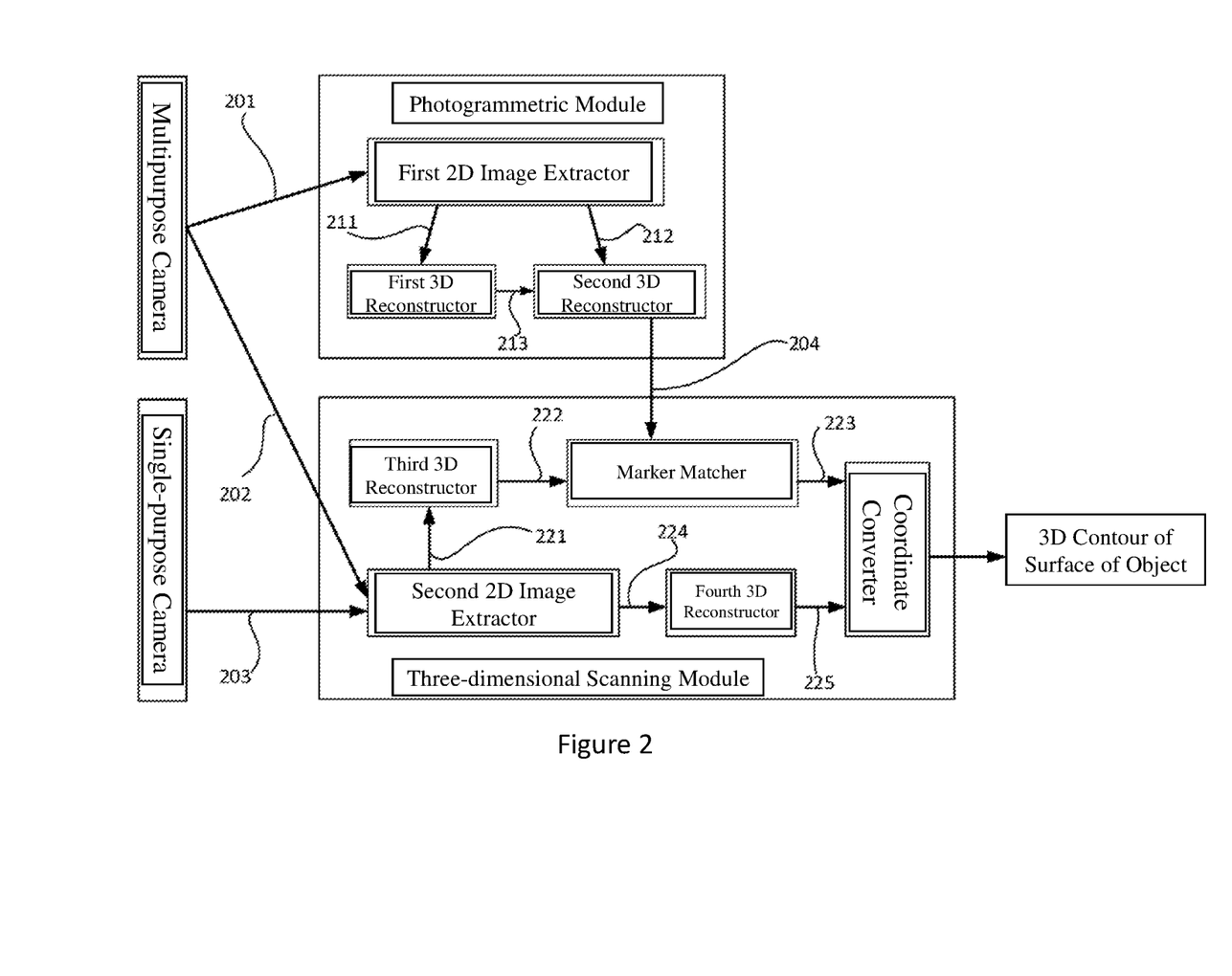
FIG. 2 is a block diagram of functional modules of a handheld large-scale three-dimensional measurement scanner system according to one or more embodiments.

As shown in FIG. 2, the photogrammetric module of the system obtains the three-dimensional coordinates of the non-encoded markers on the surface of the measured object by the following steps: 1) placing encoded markers containing encoded information, non-encoded markers containing no encoded information, and a scale of a known length of which both ends are encoded markers, on the surface of the measured object; 2) operating the multipurpose camera to capture a set of raw images 201 of the measured object from different positions and angles; 3) inputting the raw images 201 to a first two-dimensional (2D) image extractor to obtain image 2D coordinates 211 of the encoded markers and the non-encoded markers in each image; 4) performing three-dimensional reconstruction of the encoded markers and the scale information by a first 3D reconstructor to obtain spatial three-dimensional coordinates of each encoded marker in a unified world coordinate system and an exterior orientation 213 of each image; and 5) using the image 2D coordinates 212 of the non-encoded markers and the exterior orientation 213 of the image obtained by the first 2D image extractor to compute and obtain, by a second 3D reconstructor, three-dimensional coordinates 204 of the non-encoded markers in the world coordinate system.

As shown in FIG. 2, the three-dimensional scanning module obtains three-dimensional contour data of the surface of the measured object by the following steps: 1) inputting two-dimensional images 202, 203 simultaneously obtained by the two cameras to a second 2D image extractor to obtain image two-dimensional coordinates 221 of the non-encoded markers in each image and image two-dimensional coordinates of feature points projected by the pattern projector onto the surface of the measured object; 2) inputting the image two-dimensional coordinates 221 of the non-encoded markers in the two simultaneously obtained images and the known position relationship between the two cameras to a third 3D reconstructor to obtain three-dimensional coordinates 222 of the current non-encoded markers in the current device coordinate system; 3) inputting three-dimensional coordinates 222 of the current non-encoded markers in the device coordinate system obtained in a previous step to a marker matcher, wherein the marker matcher matches topological features of the inputted three-dimensional coordinates 222 of the markers in the device coordinate system with the non-encoded marker library 204 obtained by the photogrammetric module (alternatively, the three-dimensional scanning module may dynamically construct the maker library in real time during scanning by continuously identifying, splicing, and adding markers) to obtain three-dimensional coordinates of the current non-encoded markers in the world coordinate system and to further obtain an RT transformation matrix 223 under the transformation from the current device coordinate system to the world coordinate system; 4) inputting the image 2D coordinates 224 of the feature points projected by the pattern projector onto the surface of the measured object and obtained by the second 2D image extractor to a fourth 3D reconstructor to compute and obtain three-dimensional point cloud coordinate data 225 of the surface of the measured object in the device coordinate system; and 5) transforming, by a coordinate converter, a 3D point cloud 225 outputted in the previous step from the device coordinate system to the world coordinate system using the RT transformation matrix 223 obtained in step 3).

Figure 3:
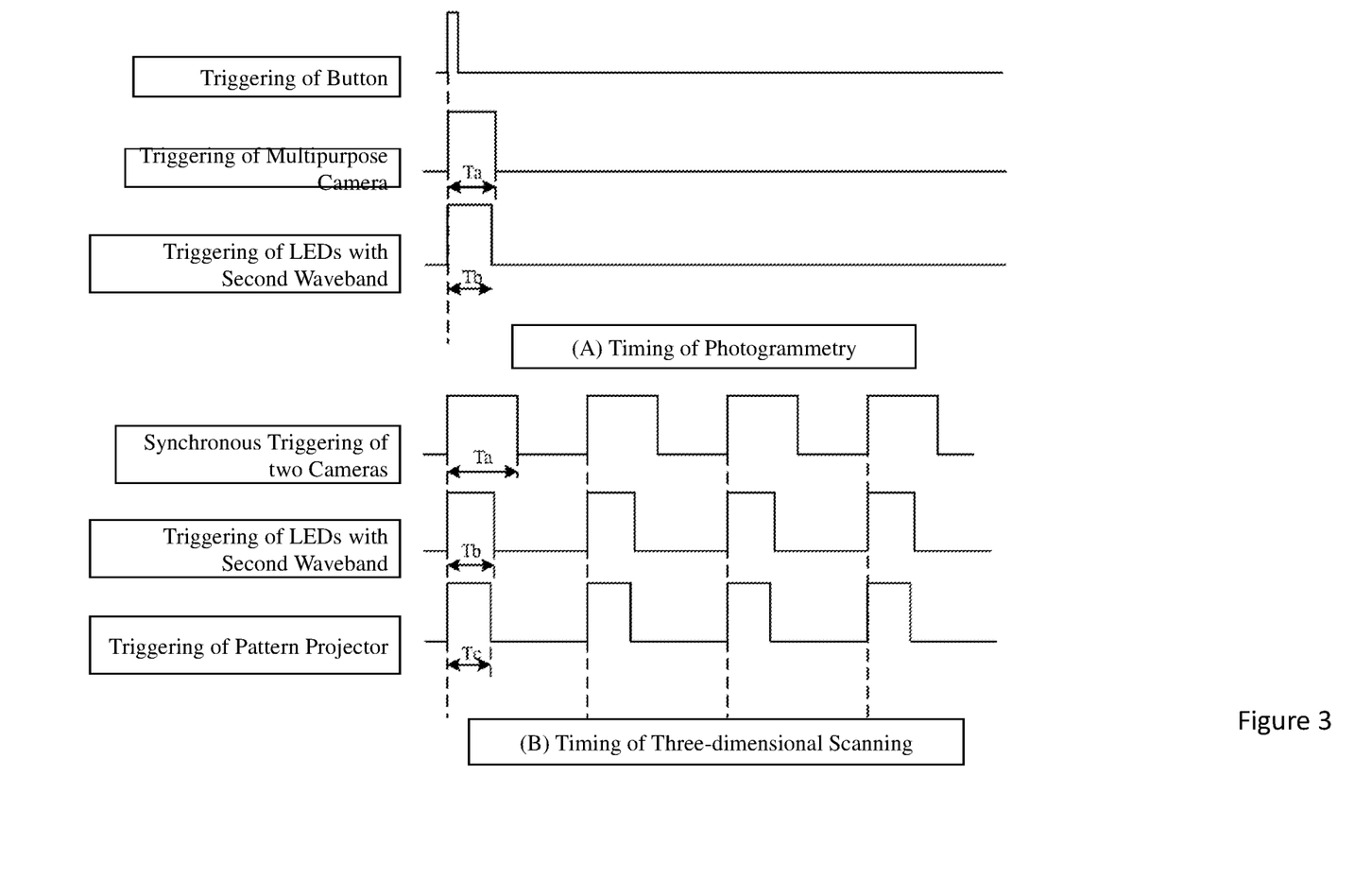
FIG. 3 is a timing diagram of a working handheld large-scale three-dimensional measurement scanner system according to one or more embodiments, wherein (A) is a photogrammetry timing and (B) is a 3D scanning timing.

As shown in FIG. 3, in photogrammetry, a manual press on the button by a user triggers the multipurpose camera to capture a frame of image while simultaneously triggering the LEDs with the first waveband to provide flash supplemental lighting on the measured object, thereby completing one instance of photogrammetry. The work timing of 3D scanning is a cyclic process: at first, the system synchronously triggers the two cameras according to a set frequency while simultaneously triggering the LEDs with the second waveband to provide supplemental lighting on the non-encoded markers on the surface of the measured object and triggering the pattern projector to project a texture pattern on the surface of the measured object.

One way of implementing the first and second image extractors is by extracting a highlight connected region on the two-dimensional image, then identifying features such as the encoded markers, the non-encoded markers, and the contour lines projected by the pattern projector through an image matching algorithm, and then obtaining a coordinate set of the center coordinates of the markers and of the center line of the contour lines on the image. The relevant algorithms are mentioned in, for example, Chinese Patent Application No. 201610824489.3, Three-Dimensional Sensor System And Three-Dimensional Data Acquisition Method, and Chinese Patent No. ZL201410794661.6, Method And Device For Handheld Laser Three-Dimensional Scanning Based On Marker Trajectory Tracking.

Figure 4:
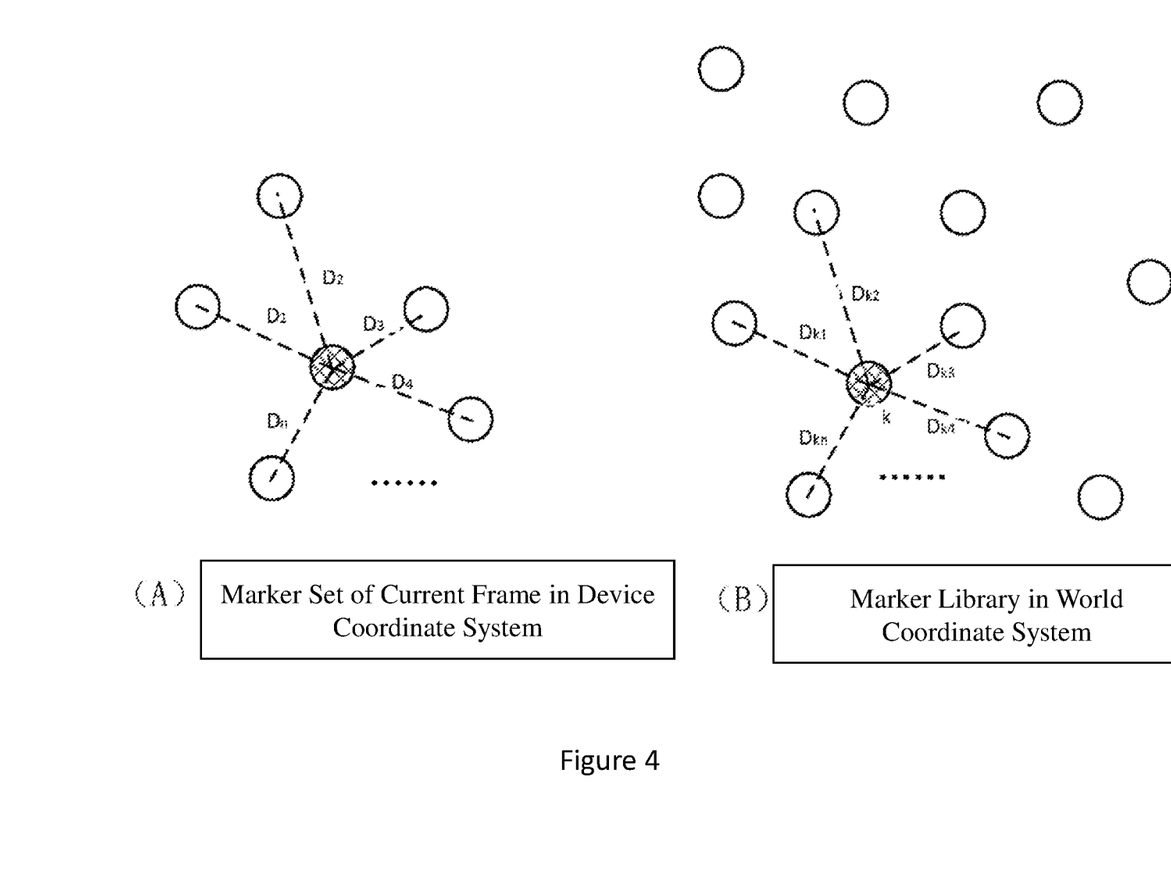
FIG. 4 is a schematic diagram of markers matching, wherein (A) is a marker set of the current frame in the device coordinate system and (B) is a marker library in the world coordinate system.

As shown in FIG. 4, one way of implementing the markers matching algorithm in the marker matcher is by counting associated parameters (one parameter in this embodiment, that is, the distance) of directed segments L1~Ln starting from each marker in the device coordinate system inputted by the third 3D reconstructor to adjacent markers within a particular distance into one data structure $\{D_1, D_2, \ldots, D_n\}$. Each element of the data structure is sorted and stored according to the value thereof. The data structure is compared with each subset of a set $\{\{D_{11}, D_{12}, \ldots, D_{1n}\}, \{D_{21}, D_{22}, \ldots, D_{2n}\}, \ldots, \{D_{m1}, D_{m2}, \ldots, D_{mn}\}\}$ of all the sorted associated parameter sets sorted according to the value of the associated parameters of each marker of the marker set $\{W_1, W_2, \ldots, W_M\}$ in the world coordinate system obtained previously by photogrammetry (the comparison may be made in two coordinate systems because it is a scalar comparison) to find a marker k with the highest correlation as the matched marker. The method of evaluating the correlation may be simply looking for the smallest statistical value of associated parameter difference: $\mathrm{Min}(\Sigma_{j=1}^{m} \Sigma_{i=1}^{n} |D_i - D_{ji}|)$. The smallest statistical value indicates that the marker in these two different coordinate systems is closest to the surrounding markers in terms of topology. There is a need to set an upper limit H of the associated parameter statistical value. If $\mathrm{Min}(\Sigma_{j=1}^{m} \Sigma_{i=1}^{n} |D_i - D_{ji}|) > H$, which indicates that there is a significant difference between the two topologies, it is determined as not associated. If no associated markers can be found in the marker set $\{W_1, W_2, \ldots, W_M\}$ obtained by photogrammetry, it is determined that the current frame cannot be matched. After obtaining the possible associated marker, the same evaluation is performed on the surrounding markers to obtain the number of associated markers in the associated marker set in the neighborhood so as to verify whether said marker is determined as the matched marker. In order to improve the accuracy of the matching, the vector of the marker itself or the angles of the directed line segments from the marker to the surrounding points may also be added to the evaluation, but this will increase the consumption of computing resources during real-time scanning.

Global photogrammetry is a fairly mature technology, which or an improvement of which is described in detail in, for example, German Patent No. DE19925462, Meβ—und Prüfsystem sowie Meβ—und Prüfverfahren für einen dreidimensionalen Körper in Zusammenhang mit dessen Fertigung, or Chinese Patent No. 200710195582.3, Method For Global Automatic Positioning Of Target Points. The principle is to capture a plurality of images from different angles by a camera and then reconstruct the encoded markers identified in the obtained images to obtain the exterior orientation of the camera when this corresponding image was captured. The first 3D reconstructor in the system performs such function. The non-encoded markers in the image can be reconstructed and matched after the exterior orientation of the camera is obtained The second 3D reconstructor in the system performs such function.

While the invention has been described with respect to a limited number of embodiments, those skilled in the art, having benefit of this disclosure, will appreciate that other embodiments can be devised which do not depart from the scope as disclosed herein. Accordingly, the scope of the invention should be limited only by the attached claims.

What is claimed is:

1. A handheld three-dimensional measurement scanner system with photogrammetric and three-dimensional scanning functions, comprising:
   two cameras at fixed positions;
   at least one pattern projector;
   and
   a processor,
   wherein at least one of the two cameras is a multipurpose camera that performs photogrammetry and three-dimensional scanning,
   wherein the processor is configured to perform, by operating the multipurpose camera, global photogrammetry on a measured object and obtain three-dimensional coordinates of markers on a surface of the object, and
   wherein the processor is configured to perform, by operating the two cameras and the pattern projector, three-dimensional scanning on the measured object by using the obtained markers as global positioning information of the measured object, and obtain three-dimensional contour data of the surface of the object.

2. The handheld three-dimensional measurement scanner system with photogrammetric and three-dimensional scanning functions according to claim 1,
   wherein one of the two cameras is the multipurpose camera and the other is a single-purpose camera that performs three-dimensional scanning.

3. The handheld large scale three-dimensional measurement scanner system with photogrammetric and three-dimensional scanning functions according to claim 2,
   wherein the processor illuminates the markers disposed on or adhered to the surface of the object by providing, from supplemental light sources with two different wavebands, supplemental lighting on the surface of the measured object,
   wherein the processor provides supplemental lighting on the measured object from a supplemental light source with a first waveband, and provides supplemental lighting on the measured object from a supplemental light source with a second waveband,
   wherein the multipurpose camera uses a dual-waveband filter to filter out light outside the first waveband and the second waveband, and the single-purpose camera uses a single-waveband filter to filter out light outside the second waveband, and
   wherein the pattern projector projects a pattern on the surface of the measured object in the second waveband.

4. The handheld three-dimensional measurement scanner system with photogrammetric and three-dimensional scanning functions according to claim 3,
wherein the first waveband is an infrared waveband and the second waveband is a red waveband.

5. The handheld three-dimensional measurement scanner system with photogrammetric and three-dimensional scanning functions according to claim 4,
wherein the multipurpose camera uses a default resolution when the processor performs photogrammetry, and
wherein the multipurpose camera uses a resolution lower than the default resolution when the processor performs three-dimensional scanning.

6. The handheld three-dimensional measurement scanner system with photogrammetric and three-dimensional scanning functions according to claim 3,
wherein the multipurpose camera uses a default resolution when the processor performs photogrammetry, and
wherein the multipurpose camera uses a resolution lower than the default resolution when the processor performs three-dimensional scanning.

7. The handheld three-dimensional measurement scanner system with photogrammetric and three-dimensional scanning functions according to claim 2,
wherein the multipurpose camera uses a default resolution when the processor performs photogrammetry, and
wherein the multipurpose camera uses a resolution lower than the default resolution when the processor performs three-dimensional scanning.

8. The handheld three-dimensional measurement scanner system with photogrammetric and three-dimensional scanning functions according to claim 7,
wherein the multipurpose camera adjusts the resolution by pixel merging or according to region of interest (ROI).

\* \* \* \* \*